United States Patent [19]
Horine

[11] 3,735,502
[45] May 29, 1973

[54] HAND HELD TEACHING MACHINE

[75] Inventor: David A. Horine, Santa Clara County; Richard B. Ball, Palo Alto, both of Calif.

[73] Assignee: Enrich, Palo Alto, Calif.

[22] Filed: Dec. 21, 1970

[21] Appl. No.: 100,312

[52] U.S. Cl. ................................................35/9 A
[51] Int. Cl. ...............................................G09b 3/06
[58] Field of Search ........................35/9 A, 9 E, 9 F

[56] References Cited
UNITED STATES PATENTS 2,760,274   8/1956   Baker ..................................35/9 A
1,749,226   3/1930   Pressey ...............................35/9 A Primary Examiner—Wm. H. Grieb
Attorney—Townsend & Townsend

[57] ABSTRACT

A hand held manually operable teaching machine is disclosed herein comprising a replaceable cartridge containing a web, typically an endless or Z-folded web and a plurality of manually operated slideable web-advancing means. The web is used for displaying frames of material to which a response is intended. Each frame of material on the web is provided with a web advancing hole at a predetermined location on a line transverse to the web in association with an appropriate one of several possible responses displayed with the material. The advancement of a pre-determined one of the web-advancing means will engage the hole associated with a correct response and advance the web for presenting another frame of material, thus indicating a correct response had been made by the operator.

9 Claims, 13 Drawing Figures 3,735,502

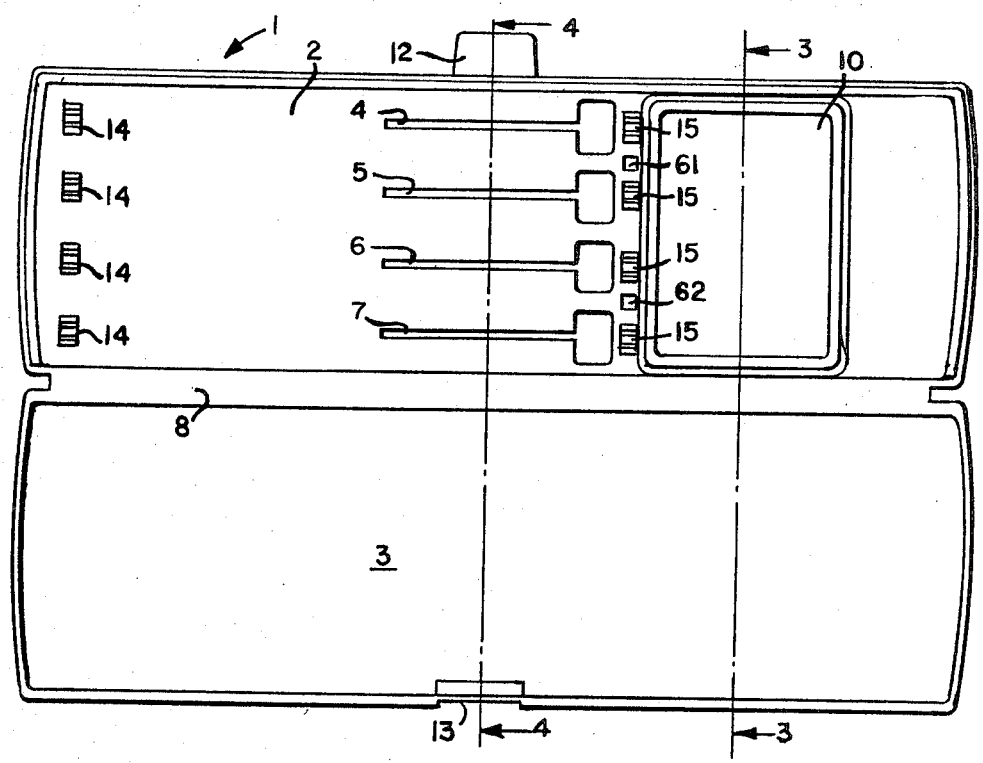
FIG. 2
FIG. 3
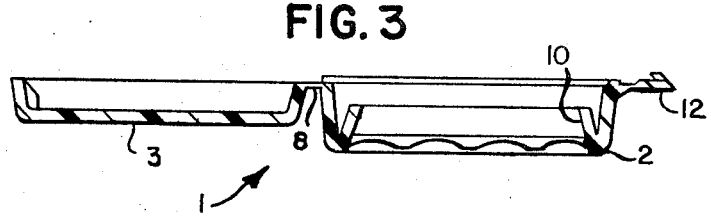
FIG. 4
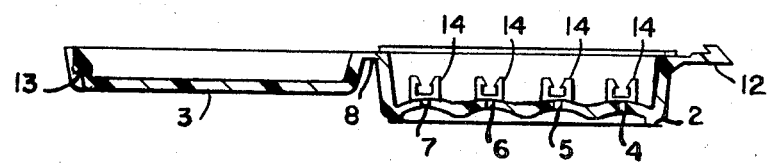

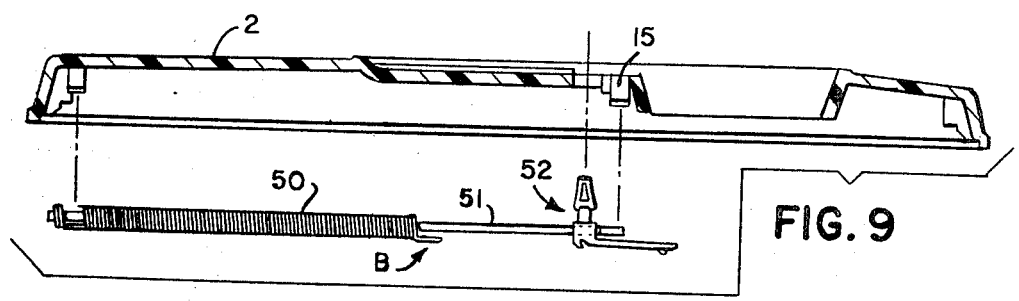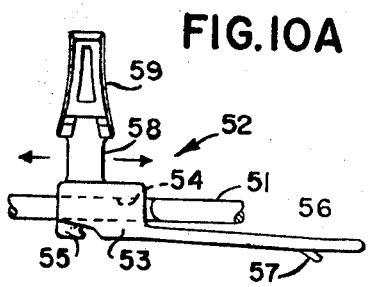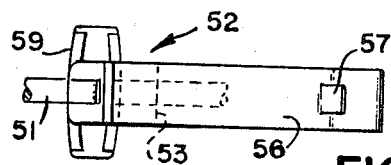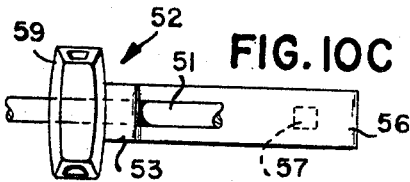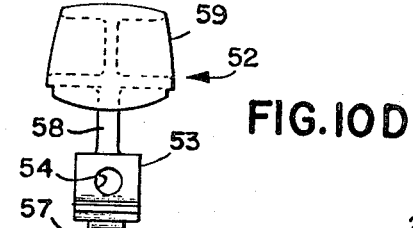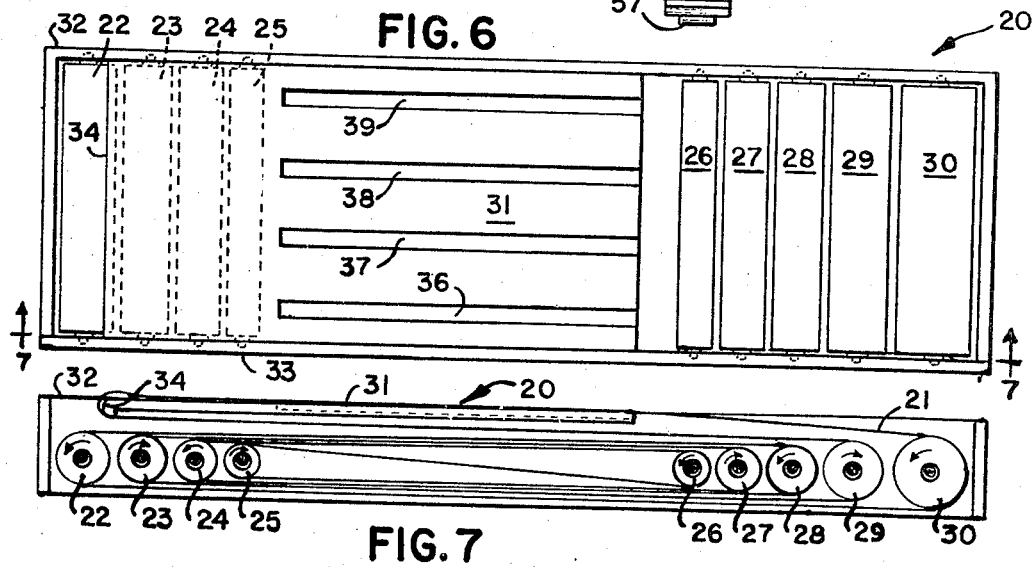

HAND HELD TEACHING MACHINE

BACKGROUND OF THE INVENTION

Numerous teaching machines have been proposed having as their object the selection by an operator of an appropriate one of several buttons or levers in response to the material being displayed. A majority of the known machines require electrical power or comprise complicated and sophisticated mechanical structures which are generally too large and too heavy for convenient hand carrying or hand-held operation and tend to require considerable expenses and expertise in their maintenance.

Because of the ever expanding requirements for wider distribution of educational materials and techniques and a dwindling availability of trained personnel especially in undeveloped countries, there is a present and future pressing need for a low cost, rugged, reliable and easily operable teaching machine which can be used by a majority of the world's population with little, if any, instruction. The machine of the present invention is also valuable as a tool in vocational training.

SUMMARY OF THE INVENTION

In accordance with the present invention there is provided a hand-held manually operable teaching machine, the operation of which is for all practical purposes self-evident. The machine is provided with a replaceable cartridge containing a plurality of frames of material to which a response is intended printed on a web. A hole in association with an appropriate one of several responses is provided in the web and adapted to be engaged by one of several slideable spring biased web-advancing members. Upon activation of the web-advancing member associated with a correct response, the web is advanced and fresh material displayed indicating a correct response has been made.

While any suitable materials may be used in making the machine, web and cartridge, the preferred materials from a standpoint of low cost and reliability are seen to be primarily conventional plastics which are readily available and easily formed by well known machining and molding techniques.

DESCRIPTION OF THE DRAWINGS

In addition to those already mentioned, other objects, features and advantages of the present invention will be apparent from the detailed description herein and accompanying drawings in which:

FIG. 2 is an inside view of the case of the present invention.

FIG. 3 is a cross-sectional view along lines 3—3 of FIG. 2.

FIG. 4 is a cross-sectional view along lines 4—4 of FIG. 2.

FIG. 6 is a partial plan view of the cartridge of FIG. 5.

FIG. 7 is an elevation view of FIG. 6.

FIG. 9 is an exploded cross-sectional view of the case and pusher-rod-spring assembly of the present invention.

FIG. 10A is an elevational view of the pusher of FIG. 9.

FIG. 10B is a bottom view of FIG. 10A.

FIG. 10C is a top view of FIG. 10A, and

FIG. 10D is a side view of FIG. 10A.

DETAILED DESCRIPTION OF THE INVENTION

In the teaching machine of the present invention as shown in FIGS. 1–4 there is provided a case 1 having a cover 2 pivotably hinged by a member 8 along one side thereof to a bottom member 3. Cover 2 and bottom member 3 cooperate to receive and retain a web bearing cartridge containing either an endless or a Z-folded web as will be described in more detail hereinafter with respect to FIGS. 5, 8.

Figure 1:
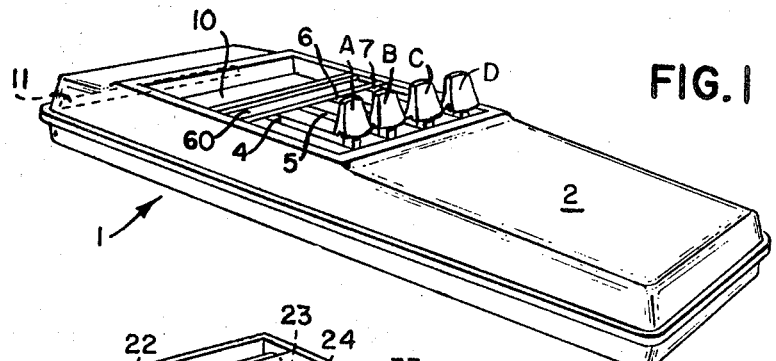
FIG. 1 is a perspective view of the present invention.

As shown in FIG. 1, cover 2 is provided with a plurality of elongated generally T-shaped slots 4, 5, 6, 7 adapted to receive and retain a plurality of web-advancing members A, B, C, D, respectively. A window or viewing port 10 is provided to the left of elongated slots 4–7 to permit viewing of material imprinted on the web. A web exit port 11 is provided in the lower left end of cover 2 to permit exiting of the web when a Z-folded web cartridge is used. As shown in FIGS. 2–4, centrally located along the edge of cover 2 opposite the hinged portion 8 is a male pop-latch member 12 which cooperates to engage a corresponding female pop-latch member 13 centrally located along the corresponding edge of bottom member 3. It is understood that both the hinging member 8 and latching members 12, 13 may be placed along the lateral edges of case 1 instead of the longitudinal edges as a matter of convenience.

As shown in detail in FIGS. 2, 4 and 9, cover 2 is further provided with a plurality of spaced apart web advancing member retaining clips 14, 15 for capturing and retaining each of web advancing members A, B, C, D as will be further described.

Figure 5:
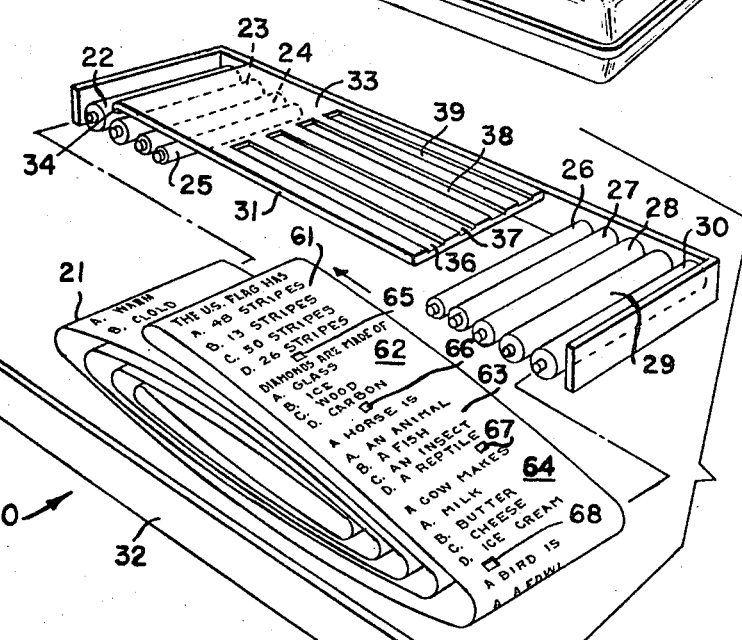
FIG. 5 is an exploded view of the cartridge of the present invention.

Referring to FIGS. 5–7, there is provided an endless web cartridge 20 suitable for use in the present invention. Cartridge 20 is provided with an endless web 21, a plurality of graduated arcuate web guiding members, typically, rollers 22–30, and a web back-up plate 31 mounted between a pair of elongated side members 32, 33.

Rollers 22–30 are graduated in cross-section in order to provide sufficient clearance between adjacent coils of web 21 to reduce friction since adjacent coils of web 21 will move in opposite directions as web 21 is advanced as shown by the arrows associated with each of rollers 22–30. Accordingly, innermost rollers 25 and 26 are provided with the smallest cross-section while outermost rollers 22 and 30 are provided with the largest cross-section. Each of interior rollers 23–29 have correspondingly reduced cross-sections depending on their position relative to the other rollers. Alternatively, fixed non-rotating arcuate members may be used in lieu of rollers, though it has been found that considerably more friction is encountered by the web.

Back-up plate 31 is mounted between the upper edges of side members 32, 33 and extends from a position approximating a line between rollers 22, 23 to a position interior of roller 26. This provides for plate 31 to extend under and somewhat beyond window 10. The left end of plate 31 is provided with a curved surface 34 over which web 21 is permitted to slide. Plate 31 is further provided with a plurality of elongated slots 36, 37, 38, 39 which are positioned to be in mechanical alignment with web advancing members A, B, C, D, respectively.

As shown in FIGS. 5, 7, when advanced by web advancing members A, B, C or D, web 21 is taken off the top of roller 30 and passes over plate 31 in the direction of the arrow. Web 21 then loosely wraps around edge 34 of plate 31 to return to the main coil of web 21 over the top of roller 29. From roller 29, web 21 passes in succession to rollers 23, 27, 25, 26, 24, 28, 22 and back to roller 30.

The extension of plate 31 to a position somewhat beyond the forward edge of window 10 is made to take advantage of the action of web 21 due to web advancing members A, B, C, D, which causes buckling of web 31 in the vicinity of edge 34 as web 21 is advanced. By allowing sufficient slack in web 21 to permit web 21 to contact the inner surface of cover 2 in the vicinity of edge 34, web 21 is directed downwardly around edge 34 with considerably less friction developing between edge 34 and web 21 then exists if web 21 is pulled around edge 34 by roller 29.

Figure 8:
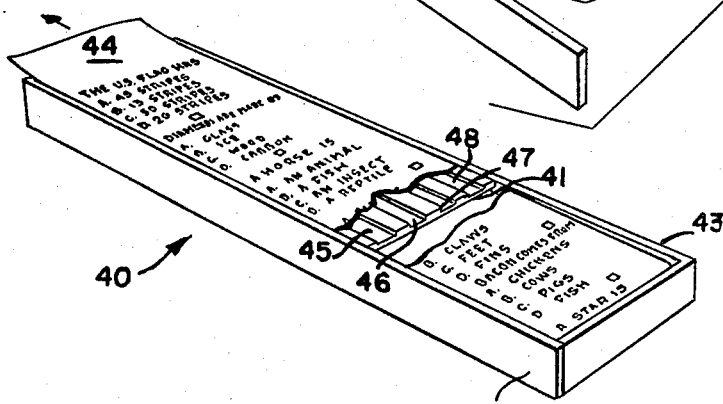
FIG. 8 is a perspective view of the Z-folded web cartridge of the present invention.

Referring to FIG. 8, there is shown a Z-folded web cartridge 40 which is suitable for use in the present invention in lieu of endless web cartridge 20. Cartridge 40 is provided with a web back-up plate 41 mounted between a pair of elongated side members 42, 43. A Z-folded web 44 is adapted to over-lay plate 41 and is in practice advanced in the direction of the arrow through exit port 11 of cover 2, shown in FIG. 1, by web advancing members A, B, C or D. Back-up plate 41 is also provided with a plurality of elongated slots 45, 46, 47, 48 which are provided to be in mechanical alignment with web advancing members A, B, C, D, respectively. It will be appreciated that after web 44 is used, it is a simple matter to open case 1 and re-insert web 44 in the manner described if it is desired to re-use it.

The assembly of one of web advancing members A, B, C, D, is shown in FIG. 9. It is understood that each of web advancing members A, B, C, D, is identical save for its position in case 1. Referring to FIGS. 9, 10A–10B, the construction and assembly of web advancing member B is shown. Web advancing member B is provided with a spring 50, a rod 51 and a pusher 52. Pusher 52, as shown in detail in FIGS. 10A–10B is provided with a body member 53. A bore 54 is provided through body member 53 and is of sufficient diameter to freely receive rod 51. A spring catch 55 is provided in the bottom of body member 53 and is adapted to engage and retain the right end of spring 50. Body member 53 is further provided with an elongated cantilevered portion 56 on the bottom surface of which near the free end is provided a web advancing boss 57. Extending from the top surface of body member 53, there is provided a pedestal 58 on which is mounted a curved member 59 adapted to be pushed by the thumb or finger of an operator of the teaching machine of the present invention.

In assembly spring 50 is slipped over the left end of rod 51 and pusher 52 slipped over the right end of rod 51. Together, the assembly is snapped into retaining clips 14, 15 in cover 2 such that retaining clips 14 capture and retain the left end of rod 51 and spring 50 while retaining clips 15 capture and retain the right end of rod 50. After member 59 is passed through the enlarged portions of T-shaped slots 4–7, member 59 is slid to the left and the right end of spring 50 coupled to spring catch 55. A cover 60 provided with a pair of pop-latches (not shown) as shown in FIG. 1 is then snapped in holes 61, 62 shown in FIG. 2 to complete the assembly. As provided, cover 60 covers the enlarged portions of T-shaped slots 4–7. In operation each of pushers 52 is free to slide along rod 51 in slots 4–7 as shown by the arrows in FIG. 10A and when released return to its rest position by spring 50. It is to be recognized that the rods 51 may be eliminated without impairing action where deformation of springs 50 due to mishandling is unlikely to occur.

For purposes of illustrating the operation of the teaching machine of the present invention, there is provided as shown in FIG. 5 a plurality of frames of educational material 61, 62, 63, 64 imprinted on web 21. Each frame of educational material 61–64 is provided with a plurality of possible responses A, B, C, D. Only one response is intended to be the correct response for any given frame of material.

To indicate which of the possible responses is the correct response, there is provided a plurality of web-advancing holes 65, 66, 67, 68. Web-advancing hole 65 is associated with a preceding frame of material, not shown. Web-advancing hole 66 is associated with the frame of material designated 61. Web-advancing hole 67 is associated with the frame of material designated 62. Web-advancing hole 68 is associated with the frame of material designated 63. The web-advancing hole associated with material designated 64 is not shown. The location of each of web-advancing holes on a line transverse to web 21 is a function of which of the possible responses is a correct response. Thus, web-advancing holes 65–68, as illustrated, fall within one of four imaginary columns which may be conveniently designated as columns A, B, C, D. Columns A, B, C, D, it is understood, are in mechanical alignment with slots 36–39 in plate 31 and hence are in mechanical alignment with web-advancing members A, B, C, D, respectively. Accordingly, if response B is the correct response to the material designated 61, which material is as illustrated presently in view through window 10, then the advancement of web-advancing member B will result in boss 57 of web-advancing member B engaging advancing hole 66 causing web 21 to be advanced presenting material 62 in window 10, thus indicating a correct response has been made. It will be appreciated that if either web-advancing member A, C, or D had been moved, web 21 would not have been advanced, indicating an incorrect response had been made. It is understood that Z-folded web 44 is provided with similar web-advancing holes.

For reliability, low cost production and wide use under a variety of environmental conditions, the teaching machine of the present invention is preferably made of high impact plastic using conventional molding techniques. The webs are plastic or plastic coated paper. Typically, case 1 is made in a single piece and cover 2 and bottom member 3 and male pop-latch member 12 are joined by what is commonly called a "living" hinge. To reduce manufacturing time, rollers 22–30 are typically made using a tree mold.

RELATED CASES

The replaceable cartridge and teaching machine using same is disclosed and claimed in copending U.S. applications Ser. Nos. 100,313 and 106,750 filed Dec. 21, 1970 and Jan. 15, 1971, respectively and assigned to the same assignee on the present invention.

I claim:

1. A teaching machine comprising: a case with a viewing window, a web for placement in the case including a web advancing hole in a predetermined location within the web, a plurality of web advancing members slideably mounted within the case, one of the web advancing members being in mechanical alignment with the web advancing hole, each web advancing member including a rod, a spring slideably fitted over the rod, a pusher slideably fitted over the rod and attached to the spring, and means spaced apart within the case for capturing and retaining the ends of the rod and one end of the spring, whereby the pusher returns to its rest position under the influence of the spring, and means associated with the one of the web advancing members for engaging the web advancing hole and advancing the web as the one advancing member is slideably moved within the case.

2. A teaching machine comprising a case dimensioned to be hand held with a window; a web for placement in the case including a web advancing hole at a predetermined location on the web; a plurality of web advancing members slideably mounted within the case, one of the web advancing members being in mechanical alignment with the web advancing hole; each web advancing member including a rod, spring means slideably fitted over the rod, a pusher slideably fitted over the rod and attached to the spring means, a portion extending out of the case for manual operation and attached to the pusher, means spaced apart within the case for capturing and retaining the ends of the rod and an end of the spring means; and means associated with the one web advancing member for engaging the web advancing hole and advancing the web as the one web advancing member is slideably moved within the case.

3. A teaching machine comprising: a generally rectangular case having a width for placement in a user's hand for hand held operation of the machine, the case including a viewing window adjacent one end of the case and a plurality of elongate, parallel slots spaced across the width of the case, extending over a portion of the length of the case and terminating adjacent the window; a longitudinally movable web for placement in the case having a plurality of web advancing holes laterally spaced over the web in accordance with the lateral spacing of the slots; a web advancing member for each slot, each member including means for positioning and guiding the member for linear movement parallel to the slot, a pusher connected to the positioning and guiding means and disposed on the exterior of the case for engagement by a user and reciprocating the pusher towards and away from the window, and means on each member for engaging an advancing hole in the web corresponding to the relative lateral position of such member; whereby the user can manually hold the case and reciprocate the member aligned with a hole towards and away from the window to advance a portion of the web into registration with the window.

4. A teaching machine according to claim 3 wherein the advancing member includes cantilevered means mounting the hole engaging means to facilitate engagement and disengagement of the hole by the hole engaging means.

5. A teaching machine according to claim 3 wherein the hole engaging means includes means for moving the web with the pusher towards the window.

6. A teaching machine according to claim 5 including means biasing the members into a released position at an end of the respective slots remote from the window.

7. A teaching machine according to claim 3 including means biasing the members into a released position at an end of the respective slots.

8. A teaching machine according to claim 7 wherein the biasing means comprises a spring.

9. A teaching machine according to claim 7 wherein the biasing means bias the members to the ends of the slots remote from the window.

* * * * *